Nov. 4, 1952 J. E. WALLACE 2,616,347
SOIL TILLING DEVICE WITH RETRACTABLE TEETH
Filed July 28, 1948 3 Sheets-Sheet 1

James E. Wallace,
INVENTOR.
BY Ralph Donath

Nov. 4, 1952 J. E. WALLACE 2,616,347
SOIL TILLING DEVICE WITH RETRACTABLE TEETH
Filed July 28, 1948 3 Sheets-Sheet 2

James E. Wallace
INVENTOR.
BY Ralph Donath

Nov. 4, 1952   J. E. WALLACE   2,616,347
SOIL TILLING DEVICE WITH RETRACTABLE TEETH
Filed July 28, 1948   3 Sheets-Sheet 3

James E. Wallace,
INVENTOR.
BY Ralph Donath

Patented Nov. 4, 1952

2,616,347

UNITED STATES PATENT OFFICE 2,616,347

SOIL TILLING DEVICE WITH RETRACTABLE TEETH

James E. Wallace, Pittsburgh, Pa.

Application July 28, 1948, Serial No. 41,150

9 Claims. (Cl. 97—40)

This invention relates to a rotary tillage device for preparing the soil prior to seeding, more particularly, to a rotary device whereby the soil is pulverized and vegetable debris is broken up and distributed over the surface in the form of a mulch.

Tillage implements such as the moldboard plow which completely invert the soil and leave it exposed to the elements promote wind and water erosion. Rotary tillage implements heretofore used avoid this objection but are subject to other objections such as breakage of scarifiers or tillage tines upon underground obstructions and choking by unbroken debris.

I have invented a rotary tillage device whereby the aforementioned disadvantages of the moldboard plow and of the rotary tillage implements heretofore used are avoided and a seed bed of finely pulverized soil covered by a mulch of broken vegetable may be produced.

My invention provides a hollow cylindrical drum rotatably mounted on a shaft through its axis and adapted to be drawn across a surface to be tilled, at the same time being rotated about the shaft in a direction opposite to its direction of travel. Scarifying means are hingedly attached to the internal periphery of the drum adjacent spaced apart openings through its peripheral wall. These scarifying means are adapted to be cyclically advanced and retracted through the openings as the drum rotates, thereby pulverizing the soil and debris. Control means force the scarifying means through the openings into the soil and are connected to resilient means whereby the scarifying means are released upon striking an obstruction. By releasing the scarifying means, breakage is reduced to a minimum. Discs may also be provided on the resilient means whereby the debris is cut before reaching the scarifying means, thus preventing choking of the device. Shredding means may be provided to pass between the scarifying means to remove any debris which may prevent the retraction of the scarifying means.

In the accompanying drawings illustrating a present preferred embodiment of my invention, Figure 1 is a side elevation of the device of my invention.

Figure 7 is a section through Figure 1 on the line 7—7.

Figure 8 is a diagrammatic side elevation of the device of my invention with the control means moved to release the scarifying means.

Figure 1:
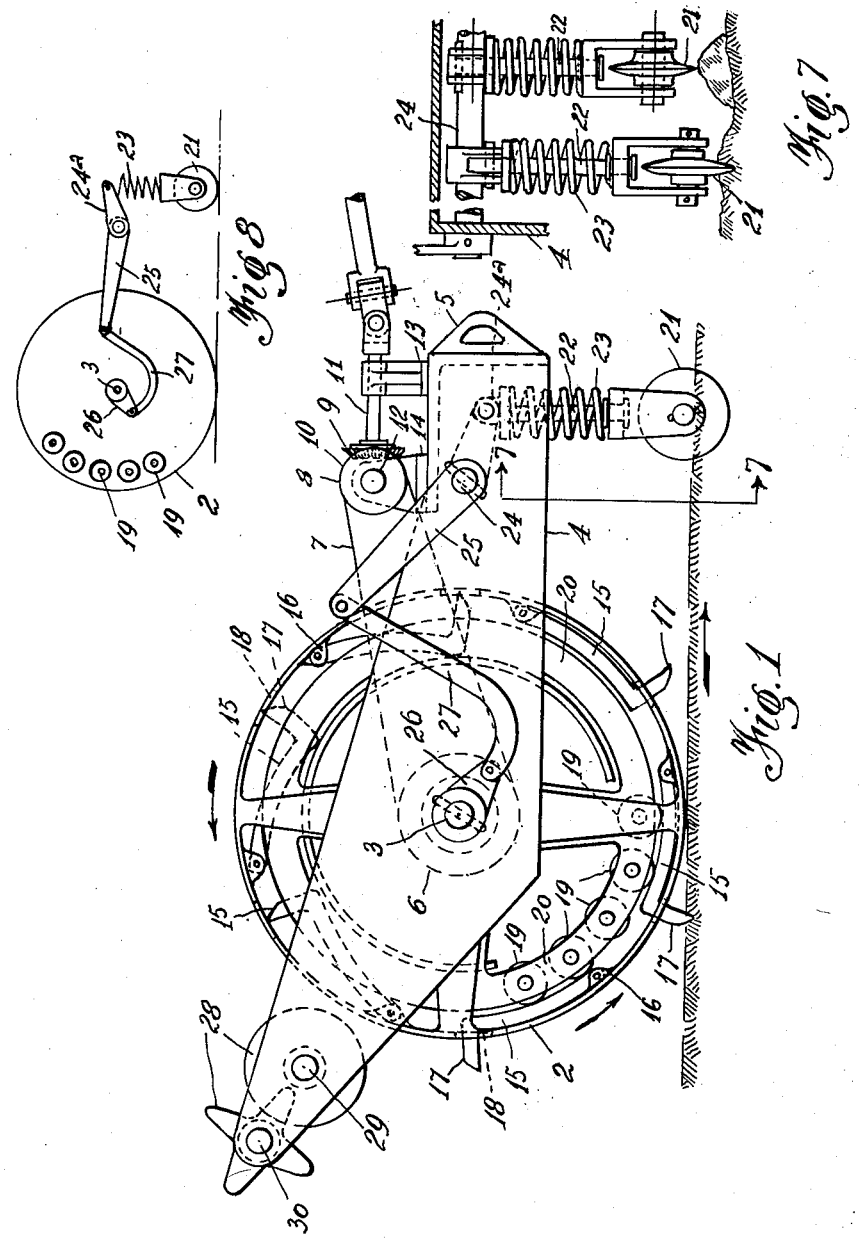
Figure 2:
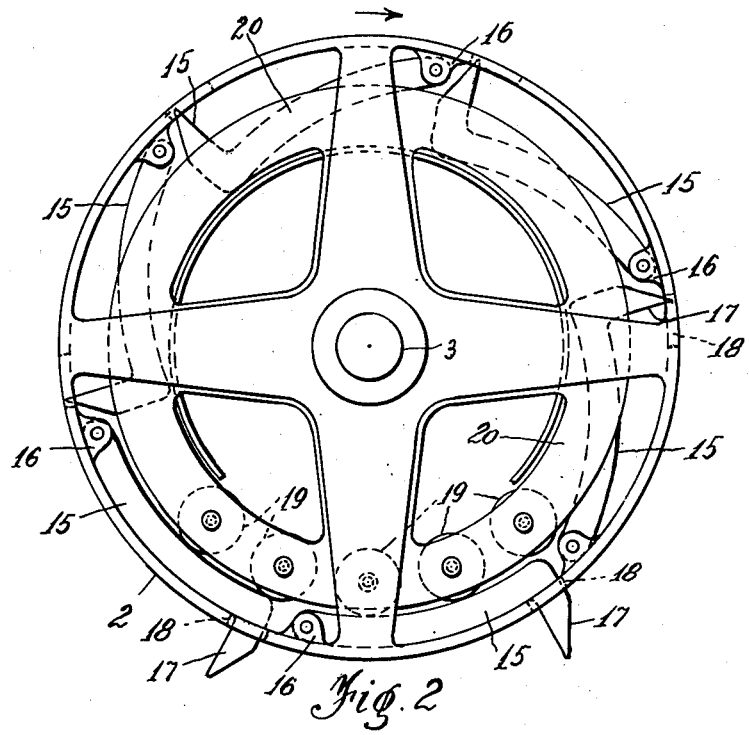
Figure 2 is a side elevation of the drum with the scarifying means and control means, looking in direction of arrow A in Figure 4.
Figure 3:
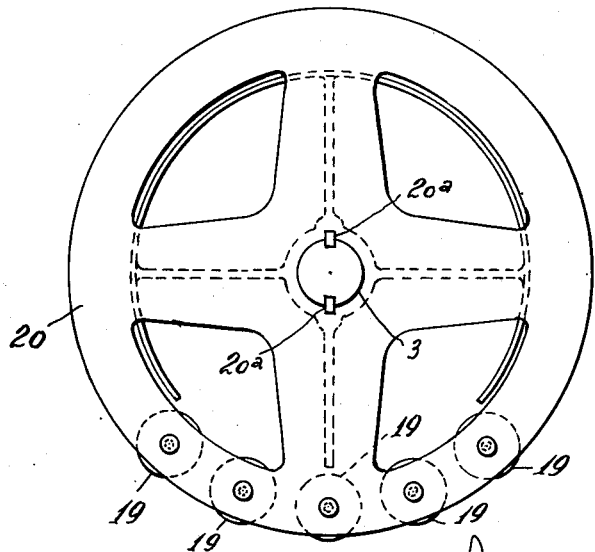
Figure 3 is a side elevation of the drum alone.

Referring first to Figure 1, I have illustrated a soil tillage device consisting of a hollow cylindrical drum 2 rotatably mounted on a shaft 3 which is journaled through a frame 4 adapted to be connected to a tractor through the clevis 5. The drum may thereby be drawn across a surface to be tilled. A sprocket wheel 6 connected to the drum 2 is driven by a chain 7 and sprocket 8 connected to the power take-off of the tractor (not shown) through a pair of bevel gears 9 and 10 connected to shafts 11 and 12 journaled in brackets 13 and 14 mounted on the frame. The drum is rotated in a direction opposite to the direction of travel of the tractor.

Figure 4:
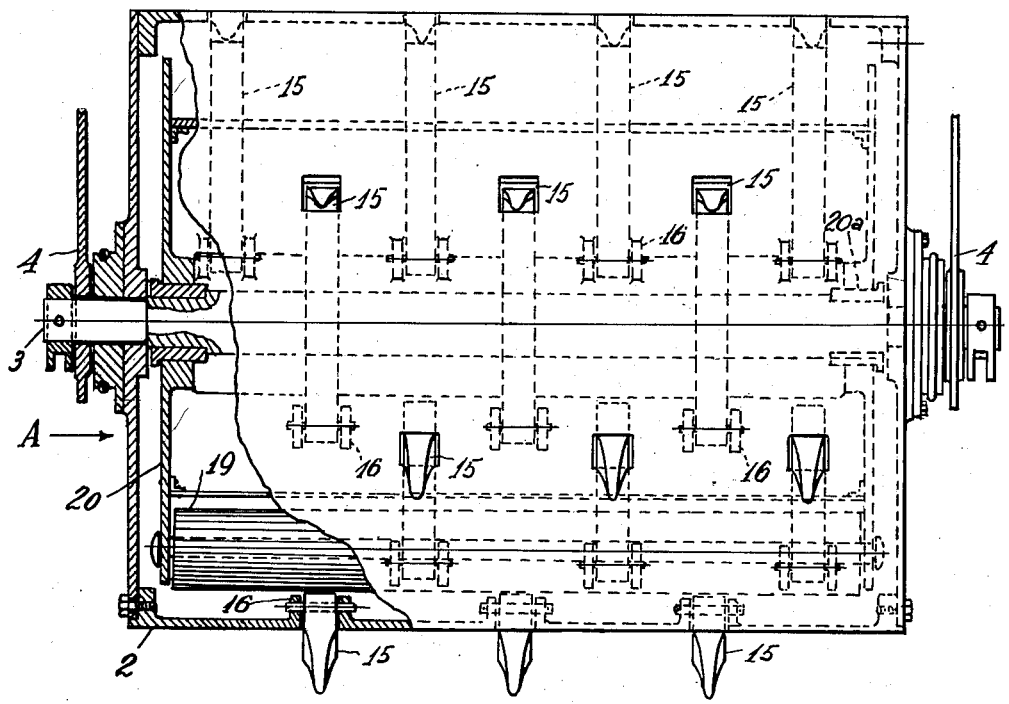
Figure 4 is a rear view partly in section of the drum with scarifying and control means.
Figure 9:
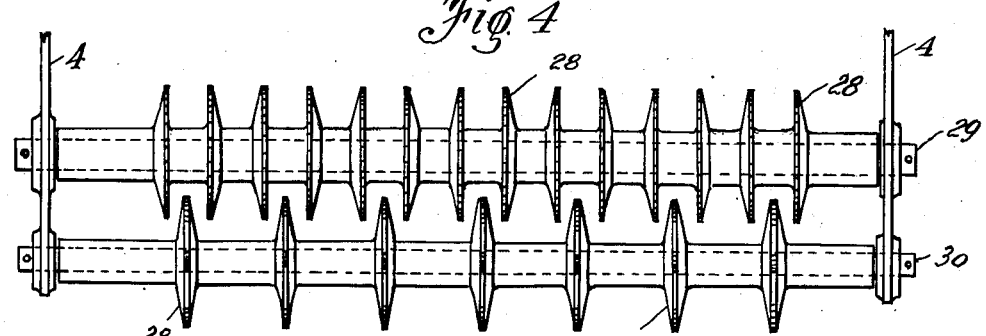
Figure 9 is a top elevation of the shredding means.
Figure 5:
Fig. 5 is a side elevation of one of the scarifying means.
Figure 6:
Figure 6 is an end elevation of one of the scarifying means.

Arcuate arms 15 are hinged in brackets 16 on the internal periphery of the drum 2. Each of the arms has a projection or tooth extending radially outwardly from its free end and adapted to pass through an opening 18 in the peripheral wall of the drum and to extend beyond the outer periphery a distance equal to the desired depth of the tillage. A series of such arms and openings stand in spaced apart relationship over the entire periphery of the drum as is more clearly shown in Figure 4. A series of rollers 19 mounted in a frame 20 keyed to shaft 3 by keys 20$^a$ rotate with the shaft 3 to force the arcuate arms 15 against the internal periphery of the drum and advance the teeth through the openings in the drum and into the soil.

The movement of rollers 19 and segmental frame 20 is controlled by swivel cutter discs 21 which precede the drum through the soil at a depth equal to the distance which the teeth 17 extend beyond the outer periphery of the drum. These discs 21 are mounted on vertical shafts 22 spaced apart in register with the teeth 17. Each disc has a compression spring 23 between it and the frame whereby it is forced into the ground. Each vertical shaft is independently connected to a shaft 24 journaled through the frame by an arm 24$a$. An arm 25 is keyed to this shaft 24 and is connected to an arm 26 on the segmental frame 20 by a connecting rod 27. Shredder discs 28 mounted on a pair of shafts 29 and 30 journaled in the frame behind the drum act to remove debris which might collect under the teeth preventing their retraction.

In operation the device is drawn by a tractor across the surface to be tilled. The drum 2 is rotated in a direction opposite to the direction of travel by means of the chain 7 and sprockets 6 and 8 which are connected to the power take-off of the tractor through shafts 11 and 12 and bevel gears 9 and 10. In normal operation the segmental frame 20 and rollers 19 force the arcuate arms 15 against the internal periphery of the drum and the teeth 17 project through the openings 18 into the soil. As the drum rotates, the projecting teeth pulverize the soil and break up the debris. The cutter discs 21, which precede the drum, cut the debris into smaller pieces which are more easily broken by the drum and shredders. When, however, an obstruction occurs in the soil, the cutter disc 21 rides over it causing the segmental frame and rollers to move into a position such as shown in Figure 8, thereby releasing the arcuate arms and permitting the teeth to be retracted. Immediately upon passing over the obstruction, the compression springs act upon the cutter discs forcing them back into the soil and drawing the segmental frame and rollers back into normal position. The shredder discs are free to rotate at will, removing debris from the teeth and forcing them to be retracted.

My invention has numerous advantages. The cutter discs prepare the soil ahead of the tilling drum, thereby doing away with the necessity of discing the soil preparatory to tillage. These same cutter discs protect the tillage teeth from breakage by striking obstructions. The drum and shredders pulverize the soil and vegetable matter producing a mulch over the surface preventing wind and water erosion.

I have illustrated and described a present preferred embodiment of my invention, but it will be understood that it may be otherwise embodied within the scope of the following claims.

I claim:

1. A soil tillage device comprising a hollow cylindrical drum rotatably mounted on a shaft through its axis and adapted to be drawn across a surface to be tilled, means for rotating the drum about the shaft in a direction opposite to its direction of travel, spaced apart openings through the peripheral wall of said drum, arcuate arms hingedly attached to the internal periphery of the drum adjacent said openings, a tooth projecting radially outwardly from the free end of each of said arms and adapted to advance and withdraw cyclically through the adjacent opening and to extend beyond the outer periphery of the drum a distance substantially equal to the desired depth of tillage, control means adapted to press against said arms forcing the teeth through said openings and into the soil at the point of tangency of the drum and surface to be tilled, resiliently mounted discs preceding the drum through the soil at a depth substantially equal to the extension of the teeth beyond the periphery of the drum and adapted to be connected to the control means to release the arcuate arms when said discs strike an obstruction.

2. A soil tillage device comprising a hollow cylindrical drum rotatably mounted on a shaft through its axis and adapted to be drawn across a surface to be tilled, means for rotating the drum about the shaft in a direction opposite to its direction of travel, spaced apart openings through the peripheral wall of said drum, arcuate arms hingedly attached to the internal periphery of the drum adjacent said openings, a tooth projecting radially outwardly from the free end of each of said arms and adapted to advance and withdraw cyclically through the adjacent opening and to extend beyond the outer periphery of the drum a distance substantially equal to the desired depth of tillage, control means adapted to press against said arms forcing the teeth through said openings and into the soil at the point of tangency of the drum and surface to be tilled, resiliently mounted discs preceding the drum through the soil at a depth substantially equal to the extension of the teeth beyond the periphery of the drum and adapted to be connected to the control means to release the arcuate arms when said discs strike an obstruction, said discs being spaced apart in register with the spaced apart openings in the periphery of the drum.

3. A soil tillage device comprising a hollow cylindrical drum rotatably mounted on a shaft through its axis and adapted to be drawn across a surface to be tilled, means for rotating the drum about the shaft in a direction opposite to its direction of travel, spaced apart openings through the peripheral wall of said drum, arcuate arms hingedly attached to the internal periphery of the drum adjacent said openings, a tooth projecting radially outwardly from the free end of each of said arms and adapted to advance and withdraw cyclically through the adjacent opening and to extend beyond the outer periphery of the drum a distance substantially equal to the desired depth of tillage, control means adapted to press against said arms forcing the teeth through said openings and into the soil at the point of tangency of the drum and surface to be tilled, resiliently mounted discs preceding the drum through the soil at a depth substantially equal to the extension of the teeth beyond the periphery of the drum and adapted to be connected to the control means to release the arcuate arms when said discs strike an obstruction, said discs being spaced apart in register with the spaced apart openings in the periphery of the drum and cleaning means mounted on said shaft and adapted to remove debris from the teeth.

4. A soil tillage device comprising a hollow cylindrical drum rotatably mounted on a shaft through its axis, said shaft being journaled through a frame adapted to be drawn by a tractor or other power actuated means, connections for rotating the drum in a direction opposite to the direction in which it is drawn, spaced apart openings through the peripheral wall of said drum, scarifying means hingedly attached to the internal periphery of the drum adjacent each of said openings, the free ends of said scarifying means being adapted to be cyclically advanced and retracted through said openings into the soil, said free ends being of a length such that when advanced through the openings in the drum they extend beyond the drum a distance substantially equal to the desired depth of tillage, control means adapted to force said scarifying means through the openings in the drum and into the soil at the point of tangency of the drum and surface to be tilted, resiliently mounted discs pivoted about a second shaft journaled in the frame parallel to the shaft of the drum so as to precede the scarifying means through the soil at a depth substantially equal to the depth of penetration of the teeth, connecting means between said discs and control means whereby the scarifying means are released when said discs strike an obstruction, and toothed shredding means mounted on a third shaft journaled in the frame parallel to the shaft of the drum and adapted to pass adjacent the scarifying means.

5. A soil tillage device comprising a hollow cylindrical drum rotatably mounted on a shaft through its axis, said shaft being journaled through a frame adapted to be drawn by a tractor or other power actuated means, connections for rotating the drum in a direction opposite to the direction in which it is drawn, spaced apart openings through the peripheral wall of said drum, arcuate arms hingedly attached to the internal periphery of the drum adjacent said openings, a tooth projecting radially outwardly from the free end of each of said arms and adapted to be cyclically advanced and retracted through the adjacent opening, said tooth being of a length substantially equal to the thickness of the peripheral wall of the drum plus the desired depth of tillage, segmental rollers keyed to the shaft and adapted to press against said arms and to force the teeth through said openings into the soil at the point of tangency of the drum and surface to be tilled, resiliently mounted discs pivoted about a second shaft parallel to the shaft of the drum, so as to precede the teeth through the soil at a depth substantially equal to the depth of penetration of the teeth, connecting means between the discs and segmental rollers whereby the rollers are moved away from the arcuate arms when the discs strike an obstruction, and toothed shredding means mounted on a third shaft parallel to the shaft of the drum and adapted to pass adjacent to the teeth.

6. A soil tillage device comprising a hollow cylindrical drum rotatably mounted on a shaft through its axis and adapted to be drawn across a surface to be tilled, means for rotating the drum about said shaft in a direction opposite to its direction of travel, spaced apart peripheral openings through said drum, scarifying means hingedly attached to the internal periphery of the drum adjacent each of said openings and adapted to be cyclically advanced and retracted therethrough at each revolution of the drum, segmental rollers mounted on the shaft through the drum and adapted to press said scarifying means through said openings at substantially the point of tangency of the drum and surface to be tilled and a plurality of resiliently mounted discs preceding the drum through the soil at a depth substantially equal to the extension of the scarifying means beyond the periphery of the drum and connected to said shaft whereby the rollers are released from the scarifying means when the discs strike an obstruction.

7. A soil tillage device as claimed in claim 6 having shredding discs mounted to rotate adjacent the periphery of the drum and spaced therefrom to pass on each side of a plane through the center of each peripheral opening transverse to the axis of rotation of the drum whereby to remove debris collected around the teeth.

8. A soil tillage device comprising a hollow cylindrical drum rotatably mounted on a shaft through its axis, said shaft being journaled through a frame adapted to be drawn across a surface to be tilled, connections for rotating the drum in a direction opposite to the direction in which it is drawn, spaced apart peripheral openings through said drum, arcuate arms hingedly attached to the internal periphery of the drum adjacent said openings, a tooth projecting radially outwardly from the free end of each of said arms and adapted to be cyclically advanced and retracted through said openings, segmental rollers mounted on the shaft through the drum and adapted to press against the arcuate arms to advance the teeth through the openings, and a plurality of mounted discs preceding the drum through the soil and connected to the shaft whereby the rollers are released from the scarifying means when the discs strike an obstruction.

9. A soil tillage device as claimed in claim 8 having shredding discs mounted on a second shaft parallel to the axis of the drum to rotate adjacent the periphery of the drum and spaced therefrom to pass on each side of a plane through the center of each peripheral opening transverse to the axis of rotation of the drum whereby to remove debris collected around the teeth.

JAMES E. WALLACE.

REFERENCES CITED

The following references are of record in the file of this patent:

UNITED STATES PATENTS

| Number | Name | Date |
| --- | --- | --- |
| 1,268,051 | Oquist | May 28, 1918 |
| 2,359,206 | Currie | Sept. 26, 1944 |

FOREIGN PATENTS

| Number | Country | Date |
| --- | --- | --- |
| 459,321 | France | Sept. 2, 1913 |
| 512,817 | France | Oct. 23, 1920 |